Nov. 7, 1933.    R. C. HOFFMAN    1,934,191
MOTOR VEHICLE
Filed Sept. 8, 1931    4 Sheets-Sheet 1
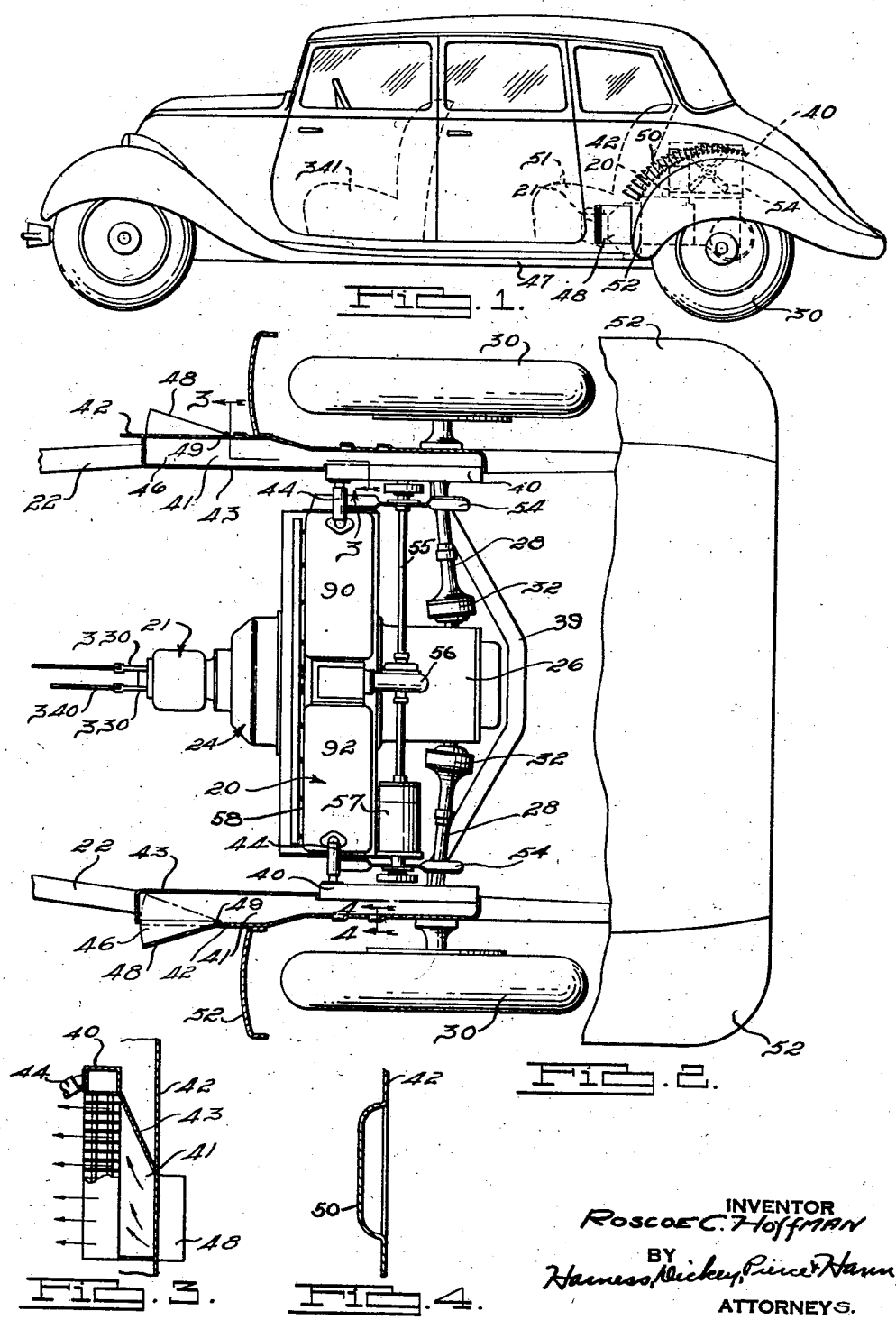
INVENTOR
Roscoe C. Hoffman
BY
Harness, Dickey, Pierce & Hann
ATTORNEYS.

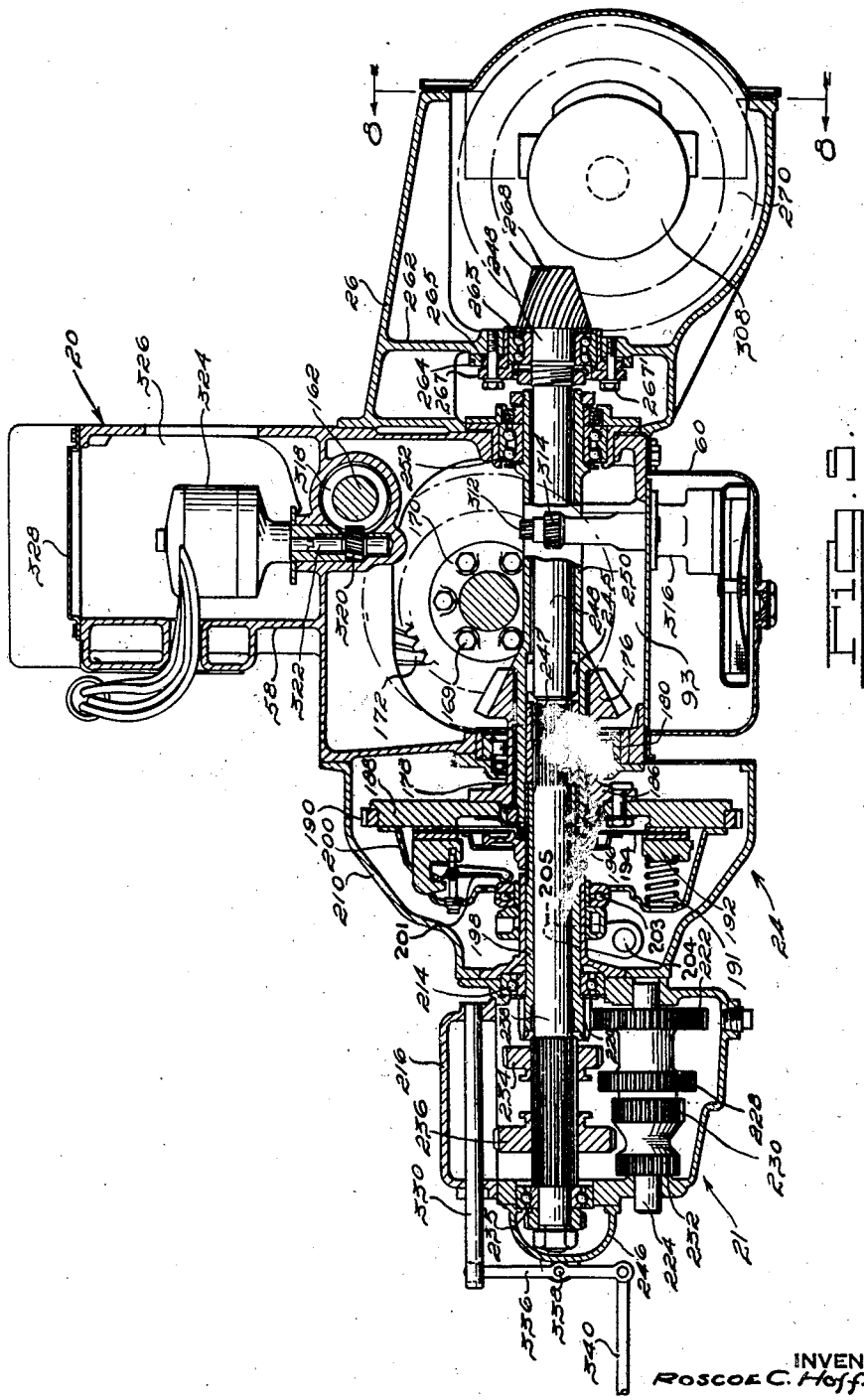

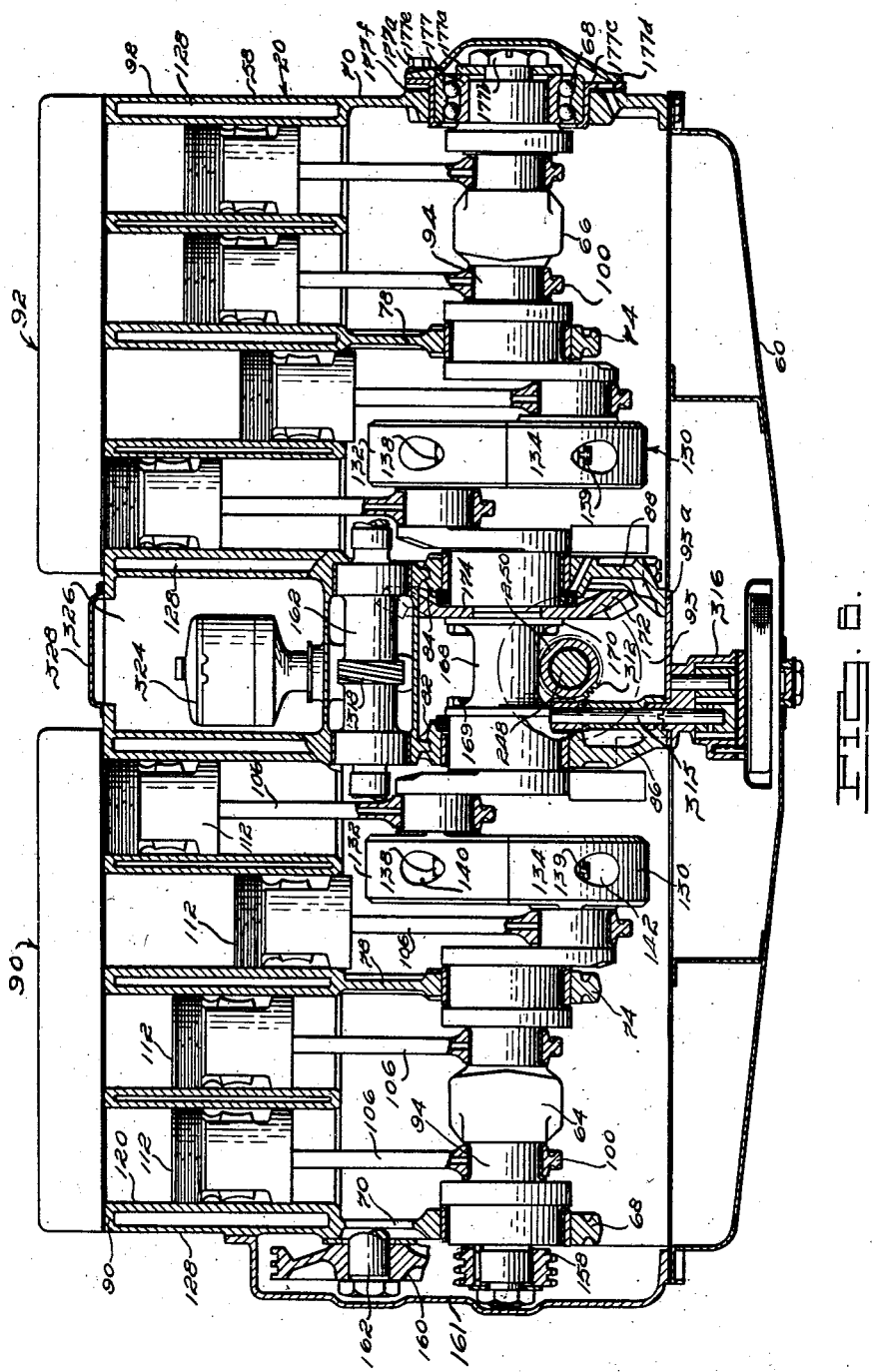

Nov. 7, 1933.        R. C. HOFFMAN        1,934,191
MOTOR VEHICLE
Filed Sept. 8, 1931        4 Sheets-Sheet 4

INVENTOR
Roscoe C. Hoffman
BY
Harness, Dickey, Pierce & Hare
ATTORNEYS

Patented Nov. 7, 1933

1,934,191

UNITED STATES PATENT OFFICE 1,934,191

MOTOR VEHICLE

Roscoe C. Hoffman, Detroit, Mich.

Application September 8, 1931. Serial No. 561,628

23 Claims. (Cl. 180—54)

This invention relates to motor vehicles and the power plants therefor, the principal object being the provision of a motor vehicle having a novel arrangement of power plant therein together with a power plant of novel design.

Objects of the present invention are to provide a motor vehicle provided with a power plant positioned at the rear end thereof; a motor vehicle in which such power plant is positioned with its longitudinal axis extending transversely of the motor; a motor vehicle of the type described in which two radiators are provided, one at each end of the engine; a motor vehicle of the type above described in which the power plant is provided with a cooling fan at each end thereof cooperatively associated with a corresponding radiator; a motor vehicle as above described in which the radiators are concealed within the outer shell of the vehicle body and the vehicle body is provided with ducts for conducting air to the radiators; a motor vehicle as above described in which such cooling ducts are positioned in a novel and efficient manner and are provided with means associated therewith for controlling the flow of air therethrough; a motor vehicle having a rear engine drive in which a novel arrangement of axle shafts is provided; a rear engine motor vehicle in which the clutch, transmission and final drive unit are so associated with the power plant as to enable a maximum amount of body room to be realized for a given wheel base; and to provide a rear engine motor vehicle in which the transmission mechanism is so associated with the power plant that it may be extended under the rear seat of the vehicle without materially affecting the normal positioning of such seat.

Other objects of the present invention are to provide a multi-cylinder internal combustion engine in which the transmission, clutch and final drive mechanism are all associated together with the engine to form a single, compact, unitary structure which may be inserted in and removed from a vehicle as such; the provision of a power plant as above described in which the various units are so arranged and encased as to be substantially oil tight and sealed against intercommunication of lubricant between each other; the provision of an internal combustion engine having a main power take-off intermediate the ends thereof and in a direction perpendicular to the length thereof; the provision of an internal combustion engine having a power take-off as above described including a ring gear secured to the crank shaft and a cooperating pinion, the ring gear and pinion being enclosed in a compartment formed internally of the engine and sealed against leakage of lubricant to and from the crank case of the engine; the provision of an internal combustion engine power plant as above described in which the pinion is of hollow construction and of the hypoid type whereby the power received thereby may be transmitted in one direction through a clutch and transmission mechanism and be returned through the center of the pinion to the opposite side of the engine and there applied to a final driving unit; the provision of an engine of the internal combustion engine type having a pair of aligned crank shafts secured together in a simple and effective manner; the provision of an engine as above described in which a driving gear is carried at the adjacent ends of the crank shafts and so associated therewith as to permit its removal without necessitating dismantling of the crank shafts from the engine; the provision of an internal combustion engine of the multi-cylinder type having a main power take-off centrally of the crank shaft thereof and having a fly wheel on the crank shaft on either side of the power take-off; the provision of a multi-cylinder internal combustion engine in which the possibility of torsional vibration of the engine crank shaft is substantially obviated; the provision of an internal combustion engine having a novel form and arrangement of torsional vibration dampers associated therewith; the provision of an internal combustion engine having a central power take-off in combination with a novel and efficient means for adjusting said power take-off and compensating for wear therein; and the provision of an automotive vehicle power plant so constructed that various units thereof may be tested individually for the purpose of isolating defects in construction.

The above being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, and in which like numerals refer to like parts throughout the several different views, Figure 1 is a side elevational view of a motor vehicle embodying features of the present invention.

Fig. 2 is an enlarged, fragmentary, partially broken, partially sectioned plan view of the vehicle shown in Fig. 1 and particularly illustrat- Fig. 3 is a fragmentary cross-sectional view, taken substantially upon the line 3—3 of Fig. 2, disclosing a convenient form of radiator structure and cooling duct arrangement for use in connection with the power plant and vehicle shown in the previous views.

Fig. 4 is an enlarged fragmentary cross-sectional view, taken substantially on the line 4—4 of Fig. 2.

Fig. 5 is a vertical cross-sectional view, taken transversely through the cylinder block and longitudinally of the power transmitting mechanism of the engine shown in the previous views.

Fig. 6 is a vertical cross-sectional view, taken longitudinally through the cylinder block of the engine shown in the previous views.

Figure 7:
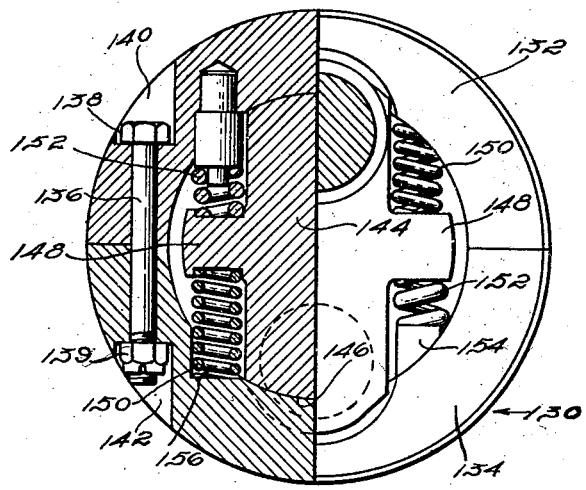
Fig. 7 is an enlarged end view, partly in section and partly in elevation, of one of the combined vibration damper and fly wheel units employed in connection with the engine shown in the preceding views.

The present invention deals particularly with that class of motor vehicles commonly known as rear engine vehicles, in other words that class of vehicles in which the engine is located at the rear end thereof, instead of at the front end as in conventional constructions. The advantages of such types of vehicles has been recognized for some time but several factors have contributed to prevent its widespread adoption by manufacturers, chief among which has been the unorthodox type of body style necessitated thereby and the inadequacy of design of power plant units to meet the conditions required. The resistance of the public to what would have seemed radical body designs in the past years is being rapidly overcome so that this factor no longer offers great difficulty to the automobile manufacturers, and the novel construction and arrangement of the power plant unit herein disclosed eliminates the objectionable features of the power plant as heretofore designed. Briefly, by the use of the present invention a motor vehicle may be designed along lines not greatly removed from the most modern type of highly stream-lined bodies and without necessitating an extreme length of so-called tail of the body rearwardly of the passenger compartment. The manner in which this is accomplished is to position the multi-cylinder engine power plant transversely of the vehicle chassis which permits, by a novel arrangement of parts, to mount the clutch and transmission unit in advance of the engine where they may, in many cases, be projected under the rear seat of the body, and mounting the final drive unit on the rear side of the engine where it is convenient to the transmission of power to the rear driving wheels of the vehicle. In this connection it is to be understood in the following description and claims that where such units are stated to be on or attached to the side of the engine, the word side is to be interpreted to mean a side lateral to the crank shaft of the engine, and not an end face thereof.

Referring to the drawings, Fig. 1 illustrates a motor vehicle of the passenger carrying type which is indicative of the manner in which a rear engine motor vehicle constructed in accordance with the present invention may be made to closely resemble motor vehicles of present day conventional construction. As best illustrated in Fig. 2, this vehicle is provided with chassis frame side rails 22 of conventional construction between which is positioned at the rear end thereof an engine indicated generally as at 20, of multi-cylinder type, with its crank shaft disposed transversely of the length of the vehicle. To the forward face of the crank case of the engine 20 is secured a clutch unit indicated generally as at 24 which in turn supports the transmission unit indicated generally as at 21, in advance thereof. To the rear face of the crank case of the engine 20 is secured a casing 26 enclosing the final drive mechanism, from each side of which projects the outwardly extending axle shafts 28, including the universal joints 32 at their inner ends and each including an additional universal joint (not shown) at its outer end. The outer ends of the shafts 28 are secured to road wheels 30 of conventional construction. The road wheels 30 are connected together by a rigid axle structure 39, rearwardly bent in the construction shown to clear the final drive unit 26. Springs (not shown), connected between the axle 39 and the chassis frame side rails 22 in a conventional manner, secure the axle 39 to the frame. It will be noted, in inspection of Fig. 2, that the drive shafts 28 incline forwardly as they project outwardly from the final drive unit 26, this feature being preferable in those cases where it is desired to diminish the wheel base of the vehicle as much as possible, although it will be readily understood that this feature is not essential to the broader aspects of the present invention.

The provision of means for cooling the engine 20 includes a pair of radiators 40 disposed at opposite ends of the engine 20 immediately inwardly of the plane of the sides of the vehicle body, these radiators being connected to the opposite ends of the engine as by connections 44. Fans 54 are provided inwardly of each of the radiators 40 for the purpose of drawing air therethrough, these fans being preferably driven from an accessory drive shaft 55 which is conventionally employed in such constructions to drive a water pump such as 56, a generator such as 57 and other accessory parts. The accessory drive shaft 55 may be driven from the engine in any suitable or conventional manner.

In order to make suitable provision for carrying air to the radiator 40 I form ducts 41 immediately inwardly of the rear side walls 42 of the body and immediately in advance of the rear fenders 52. These ducts are formed by the provision of sheet metal members 43 secured to the inner face of the walls 42 and such members are so formed as to embrace the periphery of the corresponding radiator 40 in order to insure all of the air passing through them being forced through the radiators. The ducts 41 preferably are curved so as to follow the general contour of the forward edge of the rear fenders 52, and the outer walls 42 of the body, which thus form a part of the wall of the ducts, are provided with air inlet louvers 50 in the manner best illustrated in Fig. 4. In view of the fact that during passage of the body through the air an area of high pressure is created immediately in advance of the forward edge of the fenders 52, the positioning of the louvers 50 in such area insures the passage of an ample flow of air through the duct 41 to the radiator where its flow through the same is aided by the fans 54.

In order to insure a maximum supply of air in hot weather, means are preferably provided for introducing an additional amount of air through the ducts 41, and the means herein shown for accomplishing this, comprises openings 46 formed in the side walls 42 adjacent the point of junction of the fenders 52 with the running boards 47, such openings being provided with scoop-like closures 48 hinged at their rear edges as at 49, it being understood that the openings communicate with the interior of the duct 41. It will be apparent that when the closures 48 are open they are capable of collecting and forcing a relatively great amount of air through the duct 41 to the radiators. The closures 48 may be arranged for manual operation either at or remote from their position on the body. The air which has passed through the radiators 40 to effect the cooling of the same may be simply discharged downwardly out of the vehicle below the lower end thereof.

With the above described construction the engine and radiator, as well as the final drive unit, are positioned rearwardly beyond the passenger compartment of the vehicle body, and the clutch and transmission unit 24 and 21, respectively, are located at a sufficiently low level as to permit them to be projected under the rear seat 51 of the vehicle without necessitating an unusual height of the same. Accordingly, this arrangement permits the passenger compartment to be extended a maximum amount to the rear of the vehicle and, due to the fact that the engine extends transversely of the vehicle, a minimum amount of vehicle length is consumed thereby. Furthermore, due to the fact that the engine, clutch, transmission and final drive assemblies are constructed as a unit it is possible, by disconnecting such unit from the chassis frame and disconnecting the springs from the chassis frame, to remove the entire power unit including the driving axles and the wheels from the vehicle body as a unit, in which condition the same may be readily and easily worked upon. This feature also provides a material advantage in assembling the motor vehicle in production.

Referring to the construction of the engine itself, as best shown in Figs. 5 and 6, it will be noted that it includes a combined cylinder block and crank case 58, to the lower face of which an oil pan 60 is secured in a conventional manner. The crank shaft is formed of a pair of coaxially aligned oppositely directed separately formed portions 64 and 66 which are journaled at their outer extremities in bearings 68 carried in end webs 70 of the crank case. The portions 64 and 66 are also journaled intermediate their ends in bearings 74 provided in webs 78 extending downwardly within the crank case intermediate of a pair of cylinders, and the inner ends of the parts 64 and 66 are journaled in sealed bearings 82 and 84 provided in webs 86 and 88 intermediate a pair of longitudinally spaced cylinder units 90 and 92 each of which is shown as including four cylinders. It is important that the webs 86 and 88 extend entirely across the crank case compartment and are imperforate, thus providing an intermediate gear compartment 93 which is sealed from the crank case oil by means of a bottom cover 93a, and which compartment may be employed to contain greases especially adapted for lubrication of gears of the hypoid or worm type in which more or less sliding action occurs between the movable parts.

The crank portions each include throws 94 which are embraced by bearings 100 upon the lower ends of connecting rods 106. These rods at their upper extremities are journaled in conventional pistons 112 slidable within the cylinders 120, all of conventional construction. These cylinders are surrounded by the usual water jackets 128 provided for the circulation of cooling fluid about the cylinders.

Flywheels 13` which, in the construction shown, are also formed to act as damper units, are disposed on each of the crank shaft portions 64 and 66. The flywheel units may be positioned any place in the length of the portions 64 and 66 but preferably at equal distances from and on opposite sides of the mid-point of the length of the crank shaft assembly, and preferably as close as possible to such mid point, although this last feature is not essential in all cases.

Although these flywheel units may be made of solid construction in accordance with the broader aspects of the present invention, they are shown in the drawings as formed, in accordance with the further objects of the present invention, to provide torsional vibration dampers, and these units, as disclosed in Fig. 7, each comprise a pair of outer semi-circular segments 132 and 134, the ends of which are united by means of bolts 136 to form a fly wheel like annulus. The heads 138 and 139 of these bolts are disposed in countersinks 140 and 142 formed in the outer periphery of the segments.

Certain of the crankshaft arms, such as the arm 144, have the end portions thereof so rounded as indicated at 146 as to permit rotation of the arms within the inner periphery of the segments 132 and 134. The arm is provided with laterally extending lugs 148 which are engaged upon opposite sides by means of springs 150 and 152. It will be observed that the spring 150 is of materially lighter construction than the spring 152 and it is to be understood that, if desired, the spring 152 may be eliminated, thus permitting the cross arms 148 to gear directly upon the shoulders 154 provided by pins disposed in counter-sinks formed in the segments 132 and 134. The outer extremities of the springs 150, as shown in Fig. 7, are disposed in counter-sinks 156 formed in the inner periphery of the previously mentioned segment, thereby preventing possible displacement of the ends of the springs. However, the use of compression springs 152 between the shoulders 148 and 154 is preferred in order to prevent the possibility of undesirable impact noises between the shoulders 148 and shoulders 154.

It is, of course, to be understood that as long as the crankshaft is rotating without torsional vibration the segments 132 and 134 rotate in unison therewith and the combined mass has a definite moment of inertia. However, in case the crankshaft tends to vibrate torsionally at any particular frequency, there is a relative movement between it and the segments and the moment of inertia of the system is so changed that the tendency to vibrate is overcome. Therefore, the device constitutes a simple and efficient torsional vibration damper as well as serving as a flywheel.

As best indicated in Fig. 6, the adjacent ends of the crankshaft portions 64 and 66 are rigidly connected together by means of a spool-like member 168 and bolts 169. It is to be particularly noted that a ring gear 172 piloted upon the pilot 174 on the end of the crankshaft portion 66 concentrically of the portion 66, is relatively non-rotatably clamped in such position between the flange 170 of the member 168 and the corresponding end of the crank shaft portion 66. It will thus be apparent that the ring gear 172 is positioned within the sealed compartment 93.

As best illustrated in Fig. 5 the crank case is provided in its opposite side walls with aligned openings in which are received bearings 180 and 252. Extending between the bearings 180 and 252 is a hollow shaft 250, the right hand end of which, as viewed in Fig. 5, is received directly within the bearing 252, and the left hand end of which, as indicated in Fig. 5, is externally provided with a short sleeve 178 splined thereto and which is directly received by the bearing 180. That portion of the sleeve 178 which projects into the compartment 93 has formed therein a pinion 176 which meshes with the ring gear 172, and the opposite end thereof is flanged as at 186.

The flange 186 of the sleeve 178 is fixed to a circular plate member 188 which forms a driving element of a conventional form of plate clutch and which also serves to carry a ring gear 190 for cooperation with an electric starter (not shown) of any conventional construction. The particular clutch shown includes the usual spring housing member 200 secured to the plate member 188 for maintaining the compression springs 191 in compression against the pressure plate 192, the driven plate 194 carried by the hub 196, throw out arms 201 adapted to be engaged at their inner ends by the throw out bearing 203 and controlled in its movement by the clutch shaft 204 and yoke 205. As previously stated the construction of the clutch is conventional except for the fact that the plate member 188 is of lighter construction than usual due to the fact that it does not here serve any particular function as a flywheel, and perhaps the most important difference is that the clutch driven shaft 198 is in this case made hollow for a purpose to be hereinafter explained.

The forward end of the clutch driven shaft 198 is rotatably supported at its right hand end, as viewed in Fig. 5, in the left hand end of the sleeve 178, and the left hand end of the clutch driven shaft 198 is supported in a bearing which is carried at the left hand end of the casing 210 which is rigidly secured to the left hand side of the crank case and serves to provide a dust proof enclosure for the clutch mechanism as well as to support the transmission housing 216 which is rigidly secured to a left hand end thereof and which aids in securing the bearing 214 in place.

The left hand end of the clutch driven shaft 198 projects into the transmission housing 216 and is there provided with a gear 220 which meshes with a gear 222 which forms one of a cluster of gears including the gears 228, 230 and 232 rotatably mounted upon the countershaft 224 carried by the transmission housing 216 in a conventional manner.

As also best indicated in Fig. 5 the right hand end half of the main transmission shaft 238 is formed cylindrically and is rotatably supported within the hollow interior of the clutch driven shaft 198. The left hand end of the main transmission shaft 238 is splined in the usual manner and slidably supported thereon are the shiftable gears 234 and 236. The rear end of the main transmission shaft 238 is rotatably supported in the bearing 235 supported in the left hand end of the transmission casing and the opening in this end of the casing through which the shaft projects is sealed against leakage by means of a cover member 246. The sliding gear 234, as in conventional constructions, is employed for effecting direct and intermediate speeds of the transmission and the sliding gear 236 is employed for effecting low and reverse gear speeds of the transmission. In connection with the function of the latter it will, of course, be understood that a suitable idler gear (not shown) is provided in the casing 216 for cooperation between the gears 236 and 232.

Slidably received within the upper portion of the transmission casing 216 are a pair of shifter shafts 330 which are provided with conventional shifter yokes (not shown) connected to the gears 234 and 236 respectively in the conventional manner. A pair of double armed vertically extending levers 336 are pivotally mounted at 338 on the front end of the cap 246 at the forward end of the transmission, and each lever is suitably connected at its upper end to one of the shifter shafts 330. A forwardly extending rod 340 is pivotally connected at its rear end to the lower end of each of the arms 336 and extends forwardly to in advance of the driver's seat 341 where a gear shift lever and associated mechanism (not shown) of conventional construction is provided for selectively controlling the axial positions of the shafts 330 and consequently the shiftable position of the transmission.

The right hand end of the main transmission shaft 238 projects to within the hollow shaft 250 and such end is splined and is received within the splined interior of the sleeve 247, rotatably received within the hollow shaft 250 at this point. A pinion shaft 248 extends from the right hand end of the main transmission shaft 238 through the right hand side of the crank case and its left hand end is splined for reception in the splined sleeve 247 which thus locks the transmission shaft 238 and the pinion shaft 248 together for equal rotation at all times. The left hand end of the pinion shaft 248 is rotatably supported within the hollow shaft 250 by suitable bearing rollers 245, and its right hand end, as viewed in Fig. 5, is rotatably supported in a suitable bearing 263 carried by a web 262 in the final drive housing 26 which is secured to the right hand side of the crank case viewed in this figure. The carrier for the bearing 263 is provided with a radial flange 265 which is externally threaded and which receives thereon the adjusting nut 264 which abuts against the face of the flange or web 262 and thus limits movement of the bearing 263 and consequently the pinion shaft 248 and pinion 268 to the right as viewed in Fig. 5. For preventing movement of the pinion shaft 248 and pinion 268 in the opposite direction a ring 267 is provided overlying the left hand face of the flange 265 and bolts 267' extend through the ring 267 and the flange 265 of the bearing carrier and are threaded into the web 262. By the above described means the axial position of the pinion 268 may be varied in order to adjust its meshing relationship with respect to its mating ring gear which will shortly be described.

Figure 8:
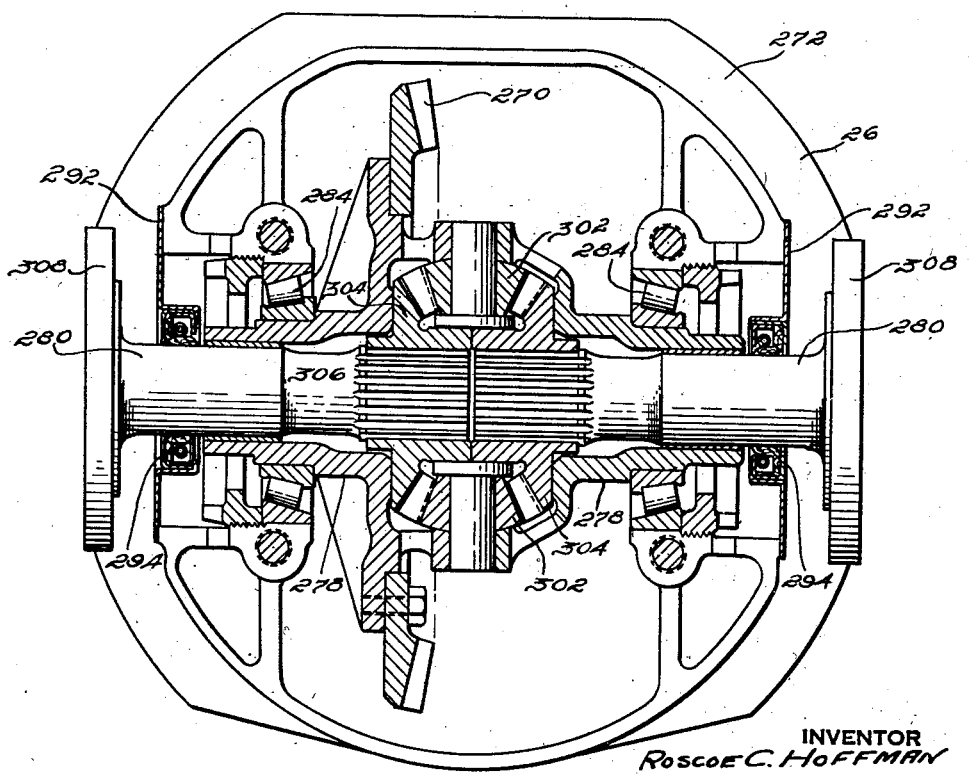
Fig. 8 is an enlarged vertical cross-sectional view through the differential mechanism and taken substantially upon the line 8—8 of Fig. 5.

As best indicated in Fig. 8 the final drive housing 26 is constructed in a manner very similar to the central portion of the rear axles of conventional types of rear axle drive motor vehicles, and includes a pair of aligned axially adjustable tapered roller bearing assemblies 284, the axes of which extend parallel to the axis of the crank shaft of the engine and between which is rotatably carried a differential carrier 278 of conventional construction to which is secured the ring gear 270 which meshes with the pinion 268 previously described. The differential carrier 278 encloses the usual radially disposed beveled pinions 302 which mesh with the oppositely disposed beveled differential gears 304 which are internally splined to receive the inner splined end of the stub shafts 280 projecting in opposite directions from opposite sides of the housing 26. The outer ends of the stub shafts 280 are flanged as at 308 to receive the universal joints 32 previously described which are connected to the axle shafts 28 as indicated in Fig. 2. Plates 292 and sealing rings 294 close the side openings in the housing 26 about the shafts 280 and prevent the escape of lubricant therefrom.

Referring again to the engine it will be apparent that it is necessary to provide some means for maintaining the proper meshing relationship between the ring gear 172 and the pinion 176. This requires that some means be provided for maintaining relative axial position of the crankshaft in a fixed but adjustable position. In accordance with the further objects of the present invention I provide such means that may be adjusted from the exterior of the crank case, thus eliminating the necessity of getting into the interior of the crank case to effect such adjustment. This adjusting and holding means is located at the right hand end of the crank case as viewed in Fig. 6 in conjunction with the bearing 68 which is shown as of the combined radial and thrust type of roller bearing. The inner race 177 of the bearing is fixed against relative axial movement of the crankshaft by means of the washer 177a and nut 177b threaded on the end of the crankshaft. The outer race of the bearing 68 is mounted in a bearing carrier 177c and maintained against relative axial movement therein by means of the cap 177d which provides an oil tight closure for the opening in this end of the crank case through which the crankshaft projects. Bolts 177e project through the cap 177d and the peripheral flange of the bearing carrier 177c are threaded into the end wall of the crankcase and maintain these parts against relative axial movement with respect thereto. Axial adjustment of the bearing carrier 177c and consequently axial adjustment of the crankshaft is effected by the addition or removal of shims 177f interposed between the peripheral flange of the bearing carrier 177c and the adjacent face of the crankcase.

A cam shaft 162 is mounted in the crankcase in accordance with conventional practice, and as illustrated in Fig. 6, the left hand end thereof projects outwardly beyond the end of the crankcase where it is provided with a sprocket gear 160. The corresponding end of the crankshaft portion 64 projects beyond the corresponding end of the crankcase and there is provided with a sprocket gear 158. A sprocket chain (not shown) of conventional construction connects the sprocket gears 158 and 160 for inter-related movement in a conventional manner. This end of the crankcase is effectively sealed against oil leakage by means of the closure member 161 secured at this end of the crankshaft in a conventional manner.

From the above it will be apparent that both ends of the engine are provided with imperforate closure members which effectively seal these ends against the leakage of oil.

Intermediate the two cylinder groups 90 and 92 the cam shaft 162 is provided with a helical gear 318 which meshes with a driven gear 320 mounted on the vertical driving shaft 322 for the distributor 324 located in the chamber 326 formed between the two cylinder units. The top of the chamber 326 is provided with a cover plate 328 and accordingly the distributor 324 is effectively sealed from contact with water which may find its way into the engine compartment of the vehicle. This hollow drive shaft 250 in the lower compartment 93 is also provided with a helical gear 312 as best shown in Fig. 5, which gear meshes with a driven gear 314 secured to the vertically extending drive shaft 315 for the oil pump 316 supported in the lower part of the oil pan 60 in a conventional manner. Features of the invention not specifically herein described will be understood to be of conventional construction.

From the above it will be understood that the construction herein described is amply sufficient to obtain the objects first stated and while I have illustrated but a single embodiment of the present invention, it will be apparent that various changes and modifications may be made in the same by those skilled in the art in view of the features herein disclosed and formal changes may be made in the specific embodiment of the invention described without departing from the spirit or substance of the broad invention, the scope of which is commensurate with the appended claims.

I claim:

1. A unitary power plant structure for automotive vehicles and the like including, in combination, an engine, a speed change mechanism upon one lateral side of the engine, a vehicle axle driving mechanism disposed upon the other lateral side of the engine, and driving means interconnecting the speed change mechanism and the axle driving mechanism.

2. A unitary plant for automotive vehicles and the like including, in combination, an engine, speed change mechanism disposed upon one lateral side of the engine, wheel driving mechanism disposed upon the opposite side of the engine, and a drive shaft extending through the engine and interconnecting the two mechanisms.

3. A unitary power plant for automotive vehicles and the like including, in combination, an engine, a speed change mechanism secured to a lateral side of the engine intermediate the ends thereof, a tubular shaft drivingly connected with an intermediate portion of a crank shaft within the engine and being further drivingly connected with the speed change mechanism, a shaft driven by the speed change mechanism and extending through the tubular shaft and engine, the extending end of the second mentioned shaft being adapted for driving connection with the wheels of a vehicle.

4. A power plant for an automotive vehicle including, in combination, an engine, a speed change mechanism secured to said engine intermediate the ends thereof and extending transversely of the length of the engine crankshaft, a differential mechanism secured to a side of the engine opposite to the speed change mechanism, the speed change mechanism and the differential mechanism being disposed in housings secured directly to the sides of the engine.

5. A power plant for an automotive vehicle or the like including, in combination, an engine disposed transversely of a vehicle frame, a clutch disposed upon one side of the engine lateral to the length of the crankshaft thereof and having a driving connection with the crank shaft of the engine, a vehicle wheel driving mechanism disposed upon the opposite side of the engine, and a driving connection between the clutch and the wheel driving mechanism.

6. A power plant for an automotive vehicle or the like including, in combination, an engine, a crank shaft within the engine, a tubular shaft disposed transversely of the engine and having a driving connection with an intermediate portion of the crank shaft, a shaft disposed within the tubular shaft, a clutch mechanism and a speed ratio controlling transmission mechanism interconnecting the tubular shaft and the shaft disposed therein, the latter shaft extending through the engine and being drivingly connected at its extremity with a wheel driving mechanism.

7. A power plant for an automotive vehicle or the like including, in combination, an engine, a crank shaft disposed within the engine, a tubular shaft extending transversely of the engine and having a driving connection with an intermediate portion of the crank shaft, a clutch secured to the outer extremity of the tubular shaft, a second tubular shaft disposed in co-axial alignment with the first mentioned shaft and being connected in driving relation with respect to the clutch, the latter mentioned tubular shaft being connected to a speed change mechanism, a shaft driven by the speed change mechanism and extending rearwardly through the tubular shaft and having a driving connection at the end opposite to the speed change mechanism with a differential mechanism.

8. In an engine, in combination, a crank shaft disposed in the engine block, a main driven shaft connected to an intermediate portion of the crank shaft and extending transversely thereof, and energy storing means secured to the crank shaft upon each side of the said driven shaft.

9. In an engine, in combination, a crank shaft disposed in the engine block, a main driven shaft connected to a intermediate portion of the crank shaft and extending transversely thereof, and vibration damper means secured to the crank shaft upon each side of said driven shaft.

10. In an internal combustion engine, in combination, a crank shaft, a driven shaft extending transversely with respect thereto, said driven shaft having a driving connection with the crank shaft and the crank shaft having a plurality of throw portions upon each side of the driven shaft, and energy storing means carried by the crank shaft adjacent to and on opposite sides of the driven shaft.

11. An internal combustion engine including, in combination, a crank shaft disposed within the engine block, a driven shaft extending transversely from the engine block from an intermediate portion of the latter, said driven shaft having a driving connection with the crank shaft and the crank shaft having a plurality of throw portions upon each side of the driven shaft and a vibration damper secured to the crank shaft adjacent to and on either side of the driven shaft, said vibration damper including a ring surrounding an arm of a throw portion of the crank shaft and spring means interposed between the arm and the ring.

12. An internal combustion engine including, in combination, an engine block having two groups of cylinders, the groups being disposed in alignment with respect to each other and the adjacent ends thereof being in spaced relation, walls closing said space, and a spark distributor disposed in the space between the ends of the groups.

13. In an internal combustion engine, in combination, a crank case having a chamber formed therein intermediate the ends thereof, a crank shaft projecting through said chamber and a main driven shaft disposed transversely of said crank shaft and drivingly connected thereto within said chamber.

14. In an internal combustion engine, in combination, a crank case having a chamber formed therein intermediate the ends thereof, a crank shaft projecting through said chamber, a main driven shaft disposed transversely of said crank shaft and drivingly connected thereto within said chamber, and means sealing said chamber against leakage of lubricant between it and said crank case.

15. In an internal combustion engine, in combination, a crank case, a crank shaft therein, a driven shaft extending transversely of said crank shaft intermediate the ends of the latter, and gearing connecting said crank shaft and said driven shaft said gearing being disposed within a substantially oil tight chamber within said crank case.

16. In an internal combustion engine, in combination, a crank case, a crank shaft therein, a driven shaft extending transversely of said crank shaft intermediate the ends of the latter, gearing connecting said crank shaft and said driven shaft, and means adjustable from the exterior of said crank case for fixing said crank shaft in axially adjusted position.

17. In an internal combustion engine, in combination, a crank case, a crank shaft therein, a driven shaft extending transversely of said crank shaft intermediate the ends of the latter, gearing connecting said crank shaft and said driven shaft, and adjustable means cooperating between an exterior wall of said crank case and said crank shaft for fixing said crank shaft in axially adjusted position.

18. In an internal combustion engine, in combination, a crank case, a crank shaft therein including a pair of aligned crank shaft portions each including a plurality of throws and having their adjacent ends positioned in spaced relation, and a member removable from said crank case without necessitating the removal of either of said portions connecting said portions for equal movement at all times.

19. In an internal combustion engine, in combination, a crank case, a crank shaft therein including a pair of aligned crank shaft portions each including a plurality of throws and having their adjacent ends positioned in spaced relation, a member removable from said crank case without necessitating the removal of either of said portions and fixing said portions together for equal movement, and a driving gear secured against relative movement with respect to said member within said crank case.

20. In combination with an internal combustion engine a speed ratio controlling gear housing and a differential gear housing secured to the sides of said engine and projecting transversely of the length thereof, the ends of said housings being completely closed against the passage of moving parts.

21. In combination with an internal combustion engine having a crank case and a crank shaft therein, a hollow shaft projecting from one lateral side of said engine connected to the crankshaft by driving gears, a shaft projecting from the opposite side of said engine rotatably received within said hollow shaft and drivingly connected thereto, the end of the latter shaft being connected to a differential mechanism.

22. In combination, an internal combustion engine, a fan carried thereby at each end of said engine, the axes of said fans lying approximately parallel to the axis of the crank shaft of said engine, and means for driving said fans from said engine.

23. In combination, an internal combustion engine, a fan carried thereby at each end of said engine, and means for driving said fans from said engine whereby each fan forces air towards the center of said engine.

ROSCOE C. HOFFMAN.